(12) United States Patent
Hatanaka et al.

(10) Patent No.: US 11,319,462 B2
(45) Date of Patent: *May 3, 2022

(54) PRESSURE SENSITIVE ADHESIVE SHEET, METHOD FOR MANUFACTURING THEREOF, AND PRESSURE SENSITIVE ADHESIVE FILM

(71) Applicant: NITTO DENKO CORPORATION, Ibaraki (JP)

(72) Inventors: Itsuhiro Hatanaka, Ibaraki (JP); Masahito Niwa, Ibaraki (JP); Taiki Shimokuri, Ibaraki (JP); Shou Takarada, Ibaraki (JP); Takahiro Nonaka, Ibaraki (JP); Keisuke Hirano, Ibaraki (JP); Fumika Kawatake, Ibaraki (JP); Mika Ikemura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 481 days.

This patent is subject to a terminal disclaimer.

(21) Appl. No.: 16/260,459

(22) Filed: Jan. 29, 2019

(65) Prior Publication Data

US 2019/0233683 A1    Aug. 1, 2019

(30) Foreign Application Priority Data

Jan. 30, 2018 (JP) .............................. JP2018-014205

(51) Int. Cl.
  *C09J 7/38* (2018.01)
  *C09J 7/10* (2018.01)
  (Continued)

(52) U.S. Cl.
  CPC ................. *C09J 7/385* (2018.01); *C09J 7/10* (2018.01); *C09J 7/20* (2018.01); *C09J 7/38* (2018.01);
  (Continued)

(58) Field of Classification Search
  None
  See application file for complete search history.

(56) References Cited

U.S. PATENT DOCUMENTS

2008/0261038 A1    10/2008    Yamamoto et al.
2013/0084416 A1*    4/2013    Nakanishi ................ C09J 7/385
                                                                                              428/40.1

(Continued)

FOREIGN PATENT DOCUMENTS

CN        101215448 A    7/2008
JP        2006-104296 A    4/2006
(Continued)

OTHER PUBLICATIONS

Notice of Reasons for Refusal dated Aug. 17, 2021 from the Japanese Patent Office in Application No. 2018-014205.

(Continued)

*Primary Examiner* — Frank D Ducheneaux
(74) *Attorney, Agent, or Firm* — Sughrue Mion, PLLC (57) ABSTRACT

The pressure sensitive adhesive sheet is a sheet shaped pressure sensitive adhesive including an acryl-based base polymer. The acryl-based base polymer contains an acryl-based segment and a urethane-based segment, and a content of the urethane-based segment is 3 to 30 parts by weight based on 100 parts by weight of the acryl-based segment. The urethane-based segment includes at least one urethane chain selected from the group consisting of a polyether urethane and a polyester urethane. The content of the urethane-based segment other than the polyether urethane- (Continued)

based segment is 15 parts by weight or less based on 100 parts by weight of the acryl-based segment.

8 Claims, 1 Drawing Sheet

(51) Int. Cl.
    *C09J 7/20*     (2018.01)
    *C09J 133/16*     (2006.01)
    *C09J 133/10*     (2006.01)
    *C09J 133/08*     (2006.01)
    *C09J 175/16*     (2006.01)
    *C09J 175/06*     (2006.01)
    *C09J 175/04*     (2006.01)
    *C09J 175/08*     (2006.01)
    *C09J 175/14*     (2006.01)
    *C09J 7/40*     (2018.01)
    *C09J 133/06*     (2006.01)

(52) U.S. Cl.
    CPC .............. *C09J 7/401* (2018.01); *C09J 133/06* (2013.01); *C09J 133/066* (2013.01); *C09J 133/08* (2013.01); *C09J 133/10* (2013.01); *C09J 175/04* (2013.01); *C09J 175/06* (2013.01); *C09J 175/08* (2013.01); *C09J 175/14* (2013.01); *C09J 175/16* (2013.01); *C09J 2301/122* (2020.08); *C09J 2301/302* (2020.08); *C09J 2433/00* (2013.01); *C09J 2475/00* (2013.01)

(56) References Cited

U.S. PATENT DOCUMENTS

| 2015/0056417 A1 | 2/2015 | Yamazki et al. |
| 2015/0232707 A1 | 8/2015 | Yoon et al. |

FOREIGN PATENT DOCUMENTS

| JP | 2014-074179 A | 4/2014 |
| JP | 2014-152225 A | 8/2014 |
| WO | 2013/161666 A1 | 10/2013 |
| WO | 2014/027788 A1 | 2/2014 |
| WO | 2017/098972 A1 | 6/2017 |

OTHER PUBLICATIONS

First Office Action dated Jul. 26, 2021 by the Chinese Patent Office in Chinese Application No. 201910086514.6.

\* cited by examiner

PRESSURE SENSITIVE ADHESIVE SHEET, METHOD FOR MANUFACTURING THEREOF, AND PRESSURE SENSITIVE ADHESIVE FILM

CROSS-REFERENCE TO RELATED APPLICATIONS

This application claims priority to Japanese Patent Application No. 2018-014205 filed on Jan. 30, 2018; the entire content thereof is herein incorporated by reference.

TECHNICAL FIELD

The present disclosure relates to a pressure sensitive adhesive sheet and a method for manufacturing thereof. The present disclosure also relates to a pressure sensitive adhesive film in which a transparent film is fixed on one surface of a pressure sensitive adhesive sheet.

BACKGROUND

A pressure sensitive adhesive sheet is used in various situations such as connection, protection and decoration of articles. Typical examples of the pressure sensitive adhesive sheet include acryl-based pressure sensitive adhesive sheets formed of a pressure sensitive adhesive mainly composed of an acryl-based base polymer. The acryl-based pressure sensitive adhesive sheet exhibits moderate wettability, cohesiveness and pressure sensitive adhesive properties such as adhesiveness, and is excellent in weather resistance, heat resistance and the like.

In the acryl-based pressure sensitive adhesive, properties such as a glass transition temperature can be easily adjusted by changing the types and copolymerization ratios of constituent monomers. In the acryl-based pressure sensitive adhesive, adhesive properties etc. can be adjusted with the cohesive force increased by introducing a crosslinked structure into a base polymer. For example, when a polymer having a reactive functional group such as a hydroxyl group or carboxyl group on a side chain is reacted with a crosslinker such as an isocyanate or epoxy, a crosslinked structure can be introduced into the polymer. In addition, by using as a copolymerizable component a polyfunctional monomer or oligomer having two or more polymerizable functional groups per molecule, a polymer having a crosslinked structure is obtained. As the polyfunctional monomer or oligomer for introducing a crosslinked structure into an acryl-based polymer, a polyfunctional (meth)acrylate is generally used.

By enhancing cohesiveness of the pressure sensitive adhesive, the shear storage elastic modulus is increased so that the adhesion retaining force tends to increase. On the other hand, when the cohesiveness of the pressure sensitive adhesive is enhanced, viscosity tends to be reduced, so that adhesive strength in a low-temperature environment may be insufficient. As a pressure sensitive adhesive excellent in adhesiveness at a low temperature, a urethane-based pressure sensitive adhesive obtained by copolymerizing a urethane oligomer and an acryl-based monomer is known (e.g., WO 2014/027788).

SUMMARY

A pressure sensitive adhesive having a structure derived from a urethane polymer chain (urethane-based segment) in a base polymer is able to have properties which are hardly achieved by a pressure sensitive adhesive obtained by using a base polymer composed only of acryl-based monomers. However, as a result of studies conducted by the present inventors, it has been found that a pressure sensitive adhesive sheet composed of a pressure sensitive adhesive obtained by using a base polymer in which a urethane-based segment and an acryl-based segment are chemically bonded to each other has the problem that the pressure sensitive adhesive sheet is clouded with deformation.

When used in applications requiring transparency, the pressure sensitive adhesive sheet may be clouded with use, leading to occurrence of a problem in visibility. For example, in a membrane switch of a household electrical appliance, a protective sheet is provided on a surface with a pressure sensitive adhesive sheet interposed therebetween for the purpose of, for example, protection of a printed portion of a surface sheet. When the pressure sensitive adhesive sheet is clouded with repetition of deformation due to depression of the switch, characters, symbols, graphics and the like printed on the surface sheet are hardly visually recognized, and thus there arises a problem such that it is difficult to identify the switch.

In view of the problem described above, it is required to provide a pressure sensitive adhesive sheet which is hardly clouded with deformation.

Disclosed is a pressure sensitive adhesive sheet in which a pressure sensitive adhesive containing an acryl-based base polymer is formed in a sheet shape. The base polymer includes an acryl-based segment and a urethane-based segment, and the content of the urethane-based segment is 3 to 30 parts by weight based on 100 parts by weight of the acryl-based segment. The urethane-based segment includes at least one urethane chain selected from the group consisting of a polyether urethane and a polyester urethane.

The pressure sensitive adhesive sheet that is hardly clouded with deformation by tension, etc. is suitable for applications requiring transparency, and particularly for applications involving deformation, such as protective films for membrane switches.

The content of the urethane-based segment other than the polyether urethane-based segment is 15 parts by weight or less based on 100 parts by weight of the acryl-based segment. The content of the polyether urethane-based segment is preferably 3 parts by weight or more based on 100 parts by weight of the acryl-based segment. The weight average molecular weight of the urethane-based segment is preferably 3000 to 50000.

In the acryl-based segment, the amount of a (meth)acrylic acid alkyl ester having a linear or branched alkyl group having 6 or less carbon atoms is preferably 30 to 80% by weight based on the total amount of constituent monomer components.

In the base polymer, the acryl-based segment and the urethane-based segment are covalently bonded to each other. In one embodiment, the acryl-based base polymer has a structure in which an acryl-based segment is crosslinked with a urethane-based segment. A polymer in which an acryl-based segment is crosslinked with a urethane-based segment is obtained by, for example, copolymerization of a monomer component for forming the acryl-based segment and a urethane (meth)acrylate having (meth)acryloyl groups at two or more terminals.

In a method for manufacturing a pressure sensitive adhesive sheet according to one embodiment, a curable pressure sensitive adhesive composition having curability is applied in a form of a layer on a substrate, and the pressure sensitive adhesive composition is cured. The pressure sensitive adhesive composition contains an acryl-based monomer and/or a partially polymerized product of the acryl-based monomer, and a urethane (meth)acrylate. A content of the urethane (meth)acrylate is 3 to 30 parts by weight based on 100 parts by weight of a total of the acryl-based monomer and partially polymerized product of the acryl-based monomer. The pressure sensitive adhesive composition may further contain a photopolymerization initiator. Preferably, the pressure sensitive adhesive composition contains 50% by weight or more of a total of the acryl-based monomer and partially polymerized product of the acryl-based monomer.

The urethane (meth)acrylate contained in the pressure sensitive adhesive composition includes at least one urethane (meth)acrylate selected from the group consisting of a polyether urethane (meth)acrylate and a polyester urethane (meth)acrylate, and a content of the urethane (meth)acrylate other than the polyether urethane (meth)acrylate is 15 parts by weight or less based on 100 parts by weight of the total of the acryl-based monomer and partially polymerized product of the acryl-based monomer. A weight average molecular weight of the urethane (meth)acrylate is preferably 3000 to 50000.

Also disclosed is a pressure sensitive adhesive film in which a transparent film is fixed onto one surface of the pressure sensitive adhesive sheet.

DETAILED DESCRIPTION OF PREFERRED EMBODIMENTS

A pressure sensitive adhesive sheet is obtained by forming a pressure sensitive adhesive in a sheet shape. A pressure sensitive adhesive for forming the pressure sensitive adhesive sheet contains an acryl-based base polymer.

[Base Polymer]

The acryl-based base polymer an acryl-based segment and a urethane-based segment. The content of the urethane-based segment in the base polymer is 3 to 30 parts by weight based on 100 parts by weight of the acryl-based segment.

When the amount of the urethane-based segment is 30 parts by weight or less, cloudiness in tensile deformation (tensile cloudiness) of the pressure sensitive adhesive sheet is suppressed. From the view point of suppressing tensile cloudiness, the amount of the urethane-based segment in the base polymer is preferably 25 parts by weight or less based on 100 parts by weight of the acryl-based segment.

The acryl-based segment and the urethane-based segment in the base polymer are covalently bonded to each other. Examples of the polymer in which an acryl-based segment and a urethane-based segment are covalently bonded to each other include: block polymers in which both segments form a main skeleton; graft polymers in which one segment forms a main skeleton, and the other segment is bonded to the main skeleton and forms a side chain; and crosslinked polymers in which one segment crosslinks the other segment. The graft polymer and the crosslinked polymer are each preferably one in which the acryl-based segment is a main skeleton, and the urethane-based segment as a side chain or a crosslinking component is chemically bonded to the acryl-based segment (acryl-based polymer chain) as a main skeleton.

The range of the amount of the urethane-based segment for suppressing tensile cloudiness of the pressure sensitive adhesive sheet may vary depending on the bonding form of the acryl-based segment and the urethane-based segment, the compositions of the acryl-based segment and the urethane-based segment, and so on. Hereinafter, the acryl-based segment and the urethane-based segment will be described, followed by describing the content of the urethane-based segment, etc. in more detail.

<Acryl-Based Segment>

The acryl-based segment contains a (meth)acrylic acid alkyl ester as a main constituent monomer component. In this specification, the "(meth)acryl" means acryl and/or methacryl.

As the (meth)acrylic acid alkyl ester, a (meth)acrylic acid alkyl ester with the alkyl group having 1 to 20 carbon atoms is preferably used. The alkyl group of the (meth)acrylic acid alkyl ester may have a branch or may have a cyclic alkyl group.

Specific examples of the (meth)acrylic acid alkyl ester having a linear or branched alkyl group include methyl (meth)acrylate, ethyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, isotridodecyl (meth)acrylate, tetradecyl (meth) acrylate, isotetradecyl (meth)acrylate, pentadecyl (meth) acrylate, cetyl (meth)acrylate, heptadecyl (meth)acrylate, octadecyl (meth)acrylate, isooctadecyl (meth)acrylate and nonadecyl (meth)acrylate.

Specific examples of the (meth)acrylic acid alkyl ester having a cycloaliphatic alkyl group include (meth)acrylic acid cycloalkyl esters such as cyclopentyl (meth)acrylate, cyclohexyl (meth)acrylate, cycloheptyl (meth)acrylate and cyclooctyl (meth)acrylate; (meth)acrylic acid esters having a dicyclic aliphatic hydrocarbon ring, such as isobornyl (meth)acrylate; and (meth)acrylic acid esters having a tri-or-more-cyclic aliphatic hydrocarbon ring, such as dicyclopentanyl (meth)acrylate, dicyclopentanyloxyethyl (meth) acrylate, tricyclopentanyl (meth)acrylate, 1-adamantyl (meth)acrylate, 2-methyl-2-adamantyl (meth)acrylate and 2-ethyl-2-adamantyl (meth)acrylate.

The amount of the (meth)acrylic acid alkyl ester based on the total amount of monomer components for forming an acryl-based segment is preferably 30% by weight or more, more preferably 40% by weight or more, further preferably 50% by weight or more. From the viewpoint of ensuring that the glass transition temperature (Tg) of the polymer chain is within an appropriate range, the amount of the (meth)acrylic acid alkyl ester having a linear or branched alkyl group having 4 to 10 carbon atoms based on the total amount of constituent monomer components in the acryl-based segment is preferably within the above range.

The constituent components of the urethane-based segment (e.g., urethane (meth)acrylate) are not included in monomer components for forming the acryl-based segment. The same applies to a case where a main skeleton structure includes a terminal functional group of a urethane-based segment in a graft polymer having a urethane-based graft side chain with an acryl-based segment as a main skeleton, or a crosslinked polymer in which an acryl-based segment is crosslinked with a urethane-based segment.

The acryl-based segment may contain a hydroxyl group-containing monomer and a carboxy group-containing monomer as constituent monomer components. When the acryl-based segment includes a hydroxyl group-containing monomer as a constituent monomer component, cloudiness of the pressure sensitive adhesive under a high-temperature and high-humidity environment tends to be suppressed, so that the pressure sensitive adhesive has high transparency.

Examples of the hydroxyl group-containing monomer include (meth)acrylic acid esters such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcydohexyl)-methyl (meth)acrylate. In particular, it is preferable that the acryl-based segment contains as a constituent monomer component a (meth)acrylic acid ester having a hydroxyalkyl group having 4 to 8 carbon atoms because it has high compatibility with the urethane-based segment, so that the pressure sensitive adhesive sheet is hardly clouded.

The amount of the hydroxy group-containing monomer based on the total amount of monomer components for forming the acryl-based segment is preferably 1 to 35% by weight, more preferably 3 to 30% by weight, further preferably 5 to 25% by weight.

Examples of the carboxy group-containing monomer include acryl-based monomers such as (meth)acrylic acid, carboxyethyl (meth)acrylate and carboxypentyl (meth)acrylate, and unsaturated fatty acids such as itaconic acid, maleic acid, fumaric acid and crotonic acid.

The acryl-based segment may contain a nitrogen-containing monomer as the constituent monomer component. Examples of the nitrogen-containing monomer include vinyl-based monomer such as N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, (meth)acryloylmorpholine, N-vinylcarboxylic acid amides and N-vinylcaprolactam; and cyanoacrylate-based polymer such as acrylonitrile and methacrylonitrile.

When the acryl-based segment contains high-polarity monomers such as a hydroxyl group-containing monomer and a carboxy group-containing monomer as constituent monomer components, the cohesive force of the pressure sensitive adhesive tends to be enhanced, leading to improvement of adhesion retainability at a high temperature. The amount of high-polarity monomers (total of a hydroxyl group-containing monomer, a carboxy group-containing monomer and a nitrogen-containing monomer) based on the total amount of monomer components for forming the acryl-based segment is preferably 1 to 60% by weight, more preferably 5 to 50% by weight, further preferably 10 to 45% by weight. The amount of the nitrogen-containing monomer based on the total amount of monomer components for forming the acryl-based segment is preferably 1 to 40% by weight, more preferably 3 to 30% by weight, further preferably 5 to 25% by weight.

Besides the above-described monomer components, the acryl-based segment may contain other monomer components. Examples of the monomer components include: vinyl-based monomers such as acid anhydride group-containing monomers, caprolactone adducts of acrylic acids, sulfonic acid group-containing monomers, phosphoric acid group-containing monomers, styrene and α-methylstyrene; cyanoacrylate-based monomers such as acrylonitrile and methacrylonitrile; epoxy group-containing monomers such as glycidyl (meth)acrylate; glycol-based acryl ester monomers such as polyethylene glycol (meth)acrylate, polypropylene glycol (meth)acrylate, methoxyethylene glycol (meth)acrylate and methoxypolypropylene glycol (meth)acrylate; and acrylic acid ester-based monomers such as tetrahydrofurfuryl (meth)acrylate, fluorine (meth)acrylate, silicone (meth)acrylate and 2-methoxyethyl (meth)acrylate.

The acryl-based segment may contain polyfunctional compound (monomer or oligomer). The polyfunctional compound includes at least two polymerizable functional groups each having an unsaturated double bond, such as (meth)acryloyl group and vinyl group, per molecule. Examples of the polyfunctional compound include polyethylene glycol di(meth)acrylate, polypropylene glycol di(meth)acrylate, polytetramethylene glycol di(meth)acrylate, bisphenol A ethylene oxide-modified di(meth)acrylate, bisphenol A propylene oxide-modified (meth)acrylate, alkanediol di(meth)acrylate, tricyclodecane dimethanol di(meth)acrylate, ethoxylated isocyanuric acid triacrylate, pentaerythritol tri(meth)acrylate, pentaerythritol di(meth)acrylate, trimethylolpropane tri(meth)acrylate, ditrimethylolpropane tetra(meth)acrylate, ethoxylated pentaerythritol tetra(meth)acrylate, pentaerythritol tetra(meth)acrylate, dipentaerythritol poly(meth)acrylate, dipentaerythritol hexa(meth)acrylate, neopentyl glycol di(meth)acrylate, glycerin di(meth)acrylate, epoxy (meth)acrylate, butadiene (meth)acrylate and isoprene (meth)acrylate.

When the acryl-based segment contains a polyfunctional monomer as a constituent monomer component, a branched structure (crosslinked structure) is introduced into the polymer chain. As described later, a crosslinked structure is introduced into the acryl-based segment by the urethane-based segment in the pressure sensitive adhesive according to one embodiment. In a base polymer having a crosslinked structure, increase of an amount of the crosslinked structure introduced by polyfunctional monomer components other than the urethane-based segment may lead to reduction of the low-temperature adhesive strength of the pressure sensitive adhesive. Thus, the amount of polyfunctional compounds based on the total amount of monomer components for forming the acryl-based segment is preferably 3% by weight or less, more preferably 1% by weight or less, further preferably 0.5% by weight or less, especially preferably 0.3% by weight or less.

Preferably, the acryl-based segment contains a (meth)acrylic acid alkyl ester in the largest amount among the above-mentioned monomer components. The thermal properties and transparency of the pressure sensitive adhesive sheet are apt to depend on the type of a monomer contained in the largest amount among the constituent monomers of the acryl-based segment (main monomer). For example, when the main monomer in the acryl-based segment is a (meth)acrylic acid alkyl ester having a linear or branched alkyl group having 6 or less carbon atoms, the acryl-based segment tends to have high compatibility with urethane-based segment, leading to suppression of tensile cloudiness, and particularly when the acrylic acid $C_4$-alkyl ester such as butyl acrylate is a main monomer, tensile cloudiness tends to be suppressed. The amount of the (meth)acrylic acid alkyl ester having a linear or branched alkyl group having 6 or less carbon atoms is preferably 30 to 80% by weight, more preferably 35 to 75% by weight, further preferably 40 to 70% by weight based on the total amount of monomer components for forming the acryl-based segment. Particularly, the content of butyl acrylate as a constituent monomer component is preferably within the above-mentioned range.

From the viewpoint of lowering the glass transition temperature of the base polymer to obtain a pressure sensitive adhesive excellent in adhesiveness at a low temperature, the glass transition temperature of the acryl-based segment is preferably 0° C. or lower. On the other hand, from the viewpoint of increasing the adhesion retaining force at a high temperature, the glass transition temperature of the acryl-based segment is preferably −30° C. or higher, more preferably −20° C. or higher, further preferably −10° C. or higher. The glass transition temperature (Tg) of the acryl-based segment is determined from a loss tangent (tan δ) peak-top temperature in measurement of the dynamic viscoelasticity (frequency: 1 Hz) of a polymer obtained by polymerizing a monomer component for forming the acryl-based segment.

In a base polymer in which an acryl-based segment and a urethane-based segment are bonded to each other, it is difficult to measure the glass transition temperature of the acryl-based segment alone, and therefore evaluation may be performed on the basis of a theoretical glass transition temperature (Tg). The theoretical glass transition temperature (Tg) is calculated from the glass transition temperature (Tg) of a homopolymer of a constituent monomer component in the acryl-based segment and the weight fraction (W) of each monomer component in accordance with the following Fox equation:

$$1/Tg = \Sigma(W_i/Tg_i).$$

Tg represents a theoretical glass transition temperature (unit: K) of the polymer chain, $W_i$ represents a weight fraction (copolymerization ratio on a weight basis) of a monomer component i forming the segment, and $Tg_i$ represents a glass transition temperature (unit: K) of a homopolymer of the monomer component i. As the glass transition temperature of the homopolymer, the value described in Polymer Handbook, 3rd edition (John Wiley & Sons, Inc., 1989) can be referred. As the glass transition temperature (Tg) of a homopolymer of a monomer which is not described in the document, a loss tangent (tan δ) peak-top temperature obtained by dynamic viscoelasticity measurement may be employed.

From the viewpoint of lowering the glass transition temperature of the base polymer to obtain a pressure sensitive adhesive excellent in adhesiveness at a low temperature, the theoretical glass transition temperature (Tg) of the acryl-based segment is preferably 10° C. or lower, more preferably 0° C. or lower. On the other hand, from the viewpoint of increasing the adhesion retaining force at a high temperature, the theoretical glass transition temperature (Tg) of the acryl-based segment is preferably −60° C. or higher, more preferably −50° C. or higher, further preferably −40° C. or higher, especially preferably −30° C. or higher.

<Urethane-Based Segment>

The urethane-based segment is a molecular chain having a urethane bond. The urethane-based segment typically includes a polyurethane chain obtained by reacting diol and diisocyanate. From the viewpoint of obtaining a pressure sensitive adhesive that can have both adhesiveness at a low temperature and a retaining force at a high temperature, the molecular weight of the polyurethane chain in the urethane-based segment is preferably 3000 to 50000, more preferably 4000 to 40000, further preferably 5000 to 30000.

Examples of the diol to be used for formation of the polyurethane chain include low-molecular-weight diols such as ethylene glycol, diethylene glycol, propylene glycol, butylene glycol and hexamethylene glycol; and high-molecular-weight polyols such as polyester polyol, polyether polyol, polycarbonate polyol, acryl polyol, epoxy polyol and caprolactone polyol.

From the viewpoint of suppressing tensile cloudiness of the pressure sensitive adhesive sheet, it is preferable the polyurethane chain includes a polyether urethane having a polyether polyol as a diol component and/or a polyester urethane having polyester polyol as a diol component, among the above-mentioned urethanes. Particularly when the polyurethane chain includes a polyether polyol, tensile cloudiness of the pressure sensitive adhesive sheet tends to be suppressed.

The polyether polyol is obtained by ring-opening and addition polymerization of an alkylene oxide with a polyhydric alcohol. Examples of the alkylene oxide include ethylene oxide, propylene oxide, butylene oxide, styrene oxide and tetrahydrofuran. Examples of the polyhydric alcohol include the above-described diols, glycerin and trimethylolpropane.

The polyester polyol is polyester having a hydroxyl group at the terminal, and is obtained by reacting a polybasic acid with a polyhydric alcohol in such a manner that the alcohol equivalent is in surplus over the carboxylic acid equivalent. As a polybasic acid component and a polyhydric alcohol component which form the polyester polyol, a combination of a dibasic acid a diol is preferable.

Examples of the dibasic acid component include aromatic dicarboxylic acids such as orthophthalic acid, isophthalic acid and terephthalic acid; cycloaliphatic dicarboxylic acids such as hexahydrophthalic acid, tetrahydrophthalic acid, 1,3-cyclohexanedicarboxylic acid and 1,4-cyclohexanedicarboxylic acid; aliphatic dicarboxylic acids such as oxalic acid, succinic acid, malonic acid, glutaric acid, adipic acid, pimelic acid, suberic acid, azelaic acid, sebacic acid, decanedicarboxylic acid, dodecanedicarboxylic acid and octadecanedicarboxylic acid; and acid anhydrides and lower alcohol esters of these dicarboxylic acids.

Examples of the diol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, diethylene glycol, triethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A and hydrogenated bisphenol F.

Examples of the polycarbonate polyol include polycarbonate polyols obtained by subjecting a diol component and phosgene to polycondensation reaction; polycarbonate polyols obtained by subjecting a diol component and a carbonic acid diester such as dimethyl carbonate, diethyl carbonate, dipropyl carbonate, diisopropyl carbonate, dibutyl carbonate, ethylbutyl carbonate, ethylene carbonate, propylene carbonate, diphenyl carbonate or dibenzyl carbonate to transesterification condensation; copolymerized polycarbonate polyols obtained using two or more polyol components; polycarbonate polyols obtained by subjecting the above-mentioned various polycarbonate polyols and a carboxy group-containing compound to esterification reaction; polycarbonate polyols obtained by subjecting the above-mentioned various polycarbonate polyols and a hydroxyl group-containing compound to etherification reaction; polycarbonate polyols obtained by subjecting the above-mentioned various polycarbonate polyols and an ester compound to transesterification reaction; polycarbonate polyols obtained by subjecting the above-mentioned various polycarbonate polyols and a hydroxyl group containing compound to transesterification reaction; polyester-based polycarbonate polyols obtained by polycondensation of the above-mentioned various polycarbonate polyols and a dicarboxylic acid compound; and copolymerized polyether-based polycarbonate polyols obtained by copolymerizing the above-mentioned various polycarbonate polyols and an alkylene oxide.

The polyacryl polyol is obtained by copolymerizing a (meth)acrylic acid ester and a monomer component having a hydroxyl group. Examples of the monomer having a hydroxyl group include (meth)acrylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate and 2-hydroxypentyl (meth)acrylate; polyhydric alcohol (meth)acrylic acid monoesters such as glycerin and trimethylolpropane; and N-methylol (meth)acrylamide. Examples of the (meth)acrylic acid ester include methyl (meth)acrylate, butyl (meth)acrylate, 2-ethylhexyl (meth)acrylate and cyclohexyl (meth)acrylate.

The polyacryl polyol may contain as a copolymerizable component a monomer component other than the components described above. Examples of the copolymerizable monomer component other than the components described above include unsaturated monocarboxylic acids such as (meth)acrylic acid; unsaturated dicarboxylic acids such as maleic acid, and anhydrides and mono- or diesters thereof; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methylvinyl ether; α-olefins such as ethylene and propylene; halogenated α,β-unsaturated aliphatic monomers such as vinyl chloride and vinylidene chloride; and α,β-unsaturated aromatic monomers such as styrene and α-methylstyrene.

The diisocyanate to be used for formation of the polyurethane chain may be either an aromatic or aliphatic diisocyanate. Examples of the aromatic diisocyanate include 1,5-naphthalene diisocyanate, 4,4'-diphenylmethane diisocyanate (MDI), 4,4'-diphenyldimethylmethane diisocyanate, tetramethyldiphenylmethane diisocyanate, 1,3-phenylene diisocyanate, 1,4-phenylene diisocyanate, 2-chloro-1,4-phenyl diisocyanate, 2,4-tolylene diisocyanate, 2,6-tolylene diisocyanate, xylylene diisocyanate, 4,4'-diphenyl ether diisocyanate, 4,4'-diphenylsulfoxide diisocyanate, 4,4'-diphenylsulfone diisocyanate and 4,4'-biphenyl diisocyanate. Examples of the aliphatic diisocyanate include butane-1,4-diisocyanate, hexamethylene diisocyanate, 2,2,4-trimethylhexamethylene diisocyanate, 2,4,4-trimethylhexamethylene diisocyanate, cyclohexane-1,4-diisocyanate, isophorone diisocyanate, dicyclohexylmethane-4,4'-diisocyanate, 1,3-bis(isocyanatemethyl)cyclohexane and methylcyclohexane diisocyanate.

As the diisocyanate, a derivative of an isocyanate compound can also be used. Examples of the derivative of an isocyanate compound include dimers of polyisocyanate, trimers of isocyanate (isocyanurates), polymeric MDI, adducts with trimethylolpropane, biuret modified products, allophanate modified products and urea modified products.

As the diisocyanate component, a urethane prepolymer having an isocyanate group at the terminal may be used. By reacting a polyhydric alcohol with a polyisocyanate compound in such a manner that the polyisocyanate compound is in surplus, a urethane prepolymer having an isocyanate group at the terminal is obtained.

When a functional group chemically bondable to an acryl-based segment is introduced to a terminal of a polyurethane chain, a covalent bond can be formed between the urethane-based segment and the acryl-based segment. For example, when a polyurethane chain having a functional group chemically bondable to a terminal of an acryl-based segment is used, a block polymer having an acryl-based segment and a urethane-based segment is obtained. When a compound having a specific functional group at one terminal of a polyurethane chain is used, a graft polymer is obtained in which a urethane-based segment is bonded as a side chain to an acryl-based segment (acryl-based polymer chain as a main skeleton). When a compound having a specific functional group at each terminal (when the polyurethane chain has at least one branch, two or more of terminals) of a polyurethane chain is used, a crosslinked structure can be introduced into the acryl-based segment by a urethane-based segment. The specific functional group contained at the terminal the polyurethane chain may be a functional group copolymerizable with a monomer component for forming an acryl-based segment, or a functional group capable of reacting with a carboxy group, a hydroxyl group or the like contained in a side chain of an acryl-based segment.

For obtaining an acryl-based base polymer in which a crosslinked structure is introduced by a urethane-based segment, it is preferable to use a compound having a (meth)acryloyl group at both terminals of a urethane chain. For example, by copolymerizing a monomer component for forming an acryl-based segment and a urethane di(meth)acrylate having a (meth)acryloyl group at both terminals, a crosslinked structure can be introduced into an acryl-based segment by a urethane-based segment. The urethane (meth)acrylate has an advantage that it is excellent in compatibility with an acryl-based monomer and an acryl-based polymer chain, so that it is easy to uniformly introduce crosslinking points into the acryl-based segment.

The urethane di(meth)acrylate having a (meth)acryloyl group at both terminals is obtained by, for example, using a (meth)acrylic compound having a hydroxyl group, in addition to a diol component, in polymerization of polyurethane. From the viewpoint of controlling the chain length (molecular weight) of the urethane-based segment, it is preferable that an isocyanate-terminated polyurethane is synthesized by reacting a diol with a diisocyanate in such a manner that the isocyanate is in surplus, and a (meth)acrylic compound having a hydroxyl group is then added to react the isocyanate group at the terminal of the polyurethane with a hydroxyl group of the (meth)acrylic compound.

By reacting a polyhydric alcohol with a polyisocyanate compound in such a manner that the polyisocyanate compound is in surplus, a urethane chain having an isocyanate group at the terminal is obtained. For obtaining an isocyanate-terminated polyurethane, a diol component and a diisocyanate component may be used in such a manner that the NCO/OH ratio (equivalent ratio) is preferably 1.1 to 2.0, more preferably 1.15 to 1.5. A diol component and a diisocyanate component may be mixed in substantially equal amounts and reacted, followed by adding a diisocyanate component.

Examples of the (meth)acrylic compound having a hydroxyl group include hydroxyethyl (meth)acrylate, hydroxypropyl (meth)acrylate, hydroxybutyl (meth)acrylate, hydroxyhexyl (meth)acrylate, hydroxymethyl acrylamide and hydroxyethyl acrylamide.

As the urethane (meth)acrylate, a commercially available product from a company such as Arakawa Chemical Industries, Ltd., Shin-Nakamura Chemical Co., Ltd., Toagosei Co., Ltd., Kyoeisha Chemical Co., Ltd., Nippon Kayaku Co., Ltd., The Nippon Synthetic Chemical Industry Co., Ltd., Negami Chemical Industrial Co., Ltd., Daicel-Allnex Ltd may be used. The weight average molecular weight of the urethane (meth)acrylate is preferably 3000 to 50000, more preferably 4000 to 40000, further preferably 5000 to 30000.

The glass transition temperature of the urethane (meth) acrylate is preferably 0° C. or lower, more preferably −10° C. or lower, further preferably −30° C. or lower, especially preferably −40° C. or lower. By using a urethane (meth) acrylate having a low glass transition temperature (Tg), a pressure sensitive adhesive excellent in adhesive strength at a low temperature even when a crosslinked structure is introduced by a urethane-based segment to enhance the cohesive force of the base polymer. The lower limit of the glass transition temperature of the urethane (meth)acrylate is not particularly limited, but is preferably −100° C. or higher, more preferably −80° C. or higher, further preferably −60° C. or higher from the viewpoint of obtaining a pressure sensitive adhesive excellent in retaining force at a high temperature.

When a crosslinked structure is introduced into the acryl-based segment by a urethane-based segment using a polyfunctional urethane (meth)acrylate such as urethane di(meth)acrylate, the glass transition temperature of the urethane-based segment of the base polymer is substantially equal to the glass transition temperature of the urethane (meth)acrylate.

<Preparation of Base Polymer>

A polymer having an acryl-based segment and a urethane-based segment can be polymerized by various known methods. A polyfunctional urethane (meth)acrylate such as a urethane di(meth)acrylate is used as a constituent component of a urethane-based segment, and a monomer component for forming an acryl-based segment and the urethane (meth)acrylate are copolymerized to obtain an acryl-based polymer in which a crosslinked structure is introduced into an acryl-based segment by a urethane-based segment.

The content of the urethane-based segment in the base polymer is preferably 3 to 30 parts by weight based on 100 parts by weight of the acryl-based segment for increasing the cohesive force by introduction of a crosslinked structure and suppressing tensile cloudiness of the pressure sensitive adhesive sheet as described above. Therefore, the amount of the urethane (meth)acrylate during preparation of the base polymer is preferably 3 to 30 parts by weight based on 100 parts by weight of the monomer component for forming the acryl-based segment.

Tensile cloudiness of the pressure sensitive adhesive sheet tends to easily occur with an increase in content of the urethane-based segment. Particularly when the content of urethane components other than the polyether urethane is increased, tensile cloudiness easily occurs. Thus, the content of urethane components other than the polyether urethane in the base polymer is preferably 7 parts by weight or less, more preferably 5 parts by weight or less, further preferably 4 parts by weight or less based on 100 parts by weight of the acryl-based segment. In addition, the content of the polyether urethane component in the base polymer is preferably 3 parts by weight or more, more preferably 5 parts by weight or more based on 100 parts by weight of the acryl-based segment.

As described above, the range of the amount of the urethane-based segment over which tensile cloudiness of the pressure sensitive adhesive sheet can be suppressed varies depending on the combination of the acryl-based segment and the urethane-based segment.

When the main monomer in the acryl-based segment is a (meth)acrylic acid alkyl ester having a linear or branched alkyl group having 6 or less carbon atoms, the acryl-based segment tends to have high compatibility with urethane-based segment, leading to suppression of tensile cloudiness. The content of the urethane-based segment in the base polymer is preferably 3 to 30 parts by weight, more preferably 5 to 25 parts by weight based on 100 parts by weight of the acryl-based segment. The content of urethane-based segments other than the polyether urethane in the base polymer is preferably 15 parts by weight or less, more preferably 12 parts by weight or less, further preferably 10 parts by weight or less based on 100 parts by weight of the acryl-based segment. The content of the polyether urethane-based segment in the base polymer is preferably 3 to 30 parts by weight, more preferably 4 to 25 parts by weight, further preferably 5 to 20 parts by weight based on 100 parts by weight of the acryl-based segment.

When the main monomer in the acryl-based segment is a (meth)acrylic acid alkyl ester having a linear or branched alkyl group having 7 to 10 carbon atoms, tensile cloudiness of the pressure sensitive adhesive sheet tends to more easily occur as compared to a case where the (meth)acrylic acid alkyl ester having a linear or branched alkyl group having 6 or less carbon atoms is a main monomer. Thus, the content of the urethane-based segment in the base polymer is preferably 3 to 20 parts by weight, more preferably 5 to 15 parts by weight based on 100 parts by weight of the acryl-based segment. The content of urethane-based segments other than the polyether urethane in the base polymer is preferably 5 parts by weight or less, more preferably 3 parts by weight or less, further preferably 1 part by weight or less based on 100 parts by weight of the acryl-based segment. The content of the polyether urethane-based segment in the base polymer is preferably 3 to 20 parts by weight, more preferably 4 to 15 parts by weight, further preferably 5 to 10 parts by weight based on 100 parts by weight of the acryl-based segment.

When a urethane (meth)acrylate is used as a constituent component of the urethane-based segment, the type and amount of the urethane (meth)acrylate may be adjusted so that the amount of the urethane-based segment falls within the above-mentioned range.

Examples of the polymerization method of the base polymer include solution polymerization, photopolymerization, block polymerization and emulsion polymerization. Solution polymerization or photopolymerization is preferable because of high reaction efficiency in radical polymerization. As a solvent for solution polymerization, ethyl acetate, toluene, etc. may be used.

A polymerization initiator such as a photopolymerization initiator or a thermopolymerization initiator may be used according to the type of polymerization reaction. Examples of the photopolymerization initiator include benzoin ether-based photopolymerization initiators, acetophenone-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzyl-based photopolymerization initiators, benzophenone-based photopolymerization initiators, ketal-based photopolymerization initiators, thioxanthone-based photopolymerization initiators and acylphosphine oxide-based photopolymerization initiators. Examples of the thermopolymerization initiator include an azo-based initiator, a peroxide-based initiator, a redox-based initiator obtained by combining a peroxide with a reducing agent (e.g., a combination of a persulfate with sodium hydrogen sulfite or a combination of a peroxide with sodium ascorbate).

In polymerization, a chain-transfer agent, a polymerization inhibitor (polymerization-delaying agent) or the like may be used for the purpose of, for example, adjusting the molecular weight. Examples of the chain-transfer agent include thiols such as α-thioglycerol, lauryl mercaptan, glycidyl mercaptan, mercaptoacetic acid, 2-mercaptoethanol, thioglycolic acid, 2-ethylhexyl thioglycolate and 2,3-dimercapto-1-propanol, and α-methylstyrene dimers.

In preparation of the base polymer, a monomer component for forming the acryl-based segment and a constituent component of the urethane segment (e.g, urethane (meth)acrylate) may be fully reacted at once, or polymerized in multiple stages according to, for example, the bonding form of the acryl-based segment and the urethane-based segment. For obtaining a polymer in which a crosslinked structure is introduced into an acryl-based segment by a urethane-based segment through polymerization in multiple stages, a method is preferable in which a monofunctional monomer for forming an acryl-based segment are polymerized to form a prepolymer composition (prepolymerization), and a polyfunctional compound such as a urethane di(meth)acrylate is added in a syrup of the prepolymer composition to polymerize the prepolymer composition and the polyfunctional monomer (postpolymerization). The prepolymer composition is a partially polymerized product containing a polymerized product with a low polymerization ratio and an unreacted monomer.

By performing prepolymerization of a constituent component of the acryl-based polymer, branch points (crosslinking points) with a polyfunctional compound such as a urethane di(meth)acrylate can be uniformly introduced into the acryl-based segment. In addition, the pressure sensitive adhesive sheet can also be formed by applying a mixture of a low-molecular-weight polymer or a partially polymerized product and an unpolymerized monomer component (pressure sensitive adhesive composition) onto a substrate, and then performing postpolymerization on the substrate.

A low-polymerization composition such as a prepolymer composition has a low viscosity, and is thus excellent in application property, and therefore by using a method in which a pressure sensitive adhesive composition that is a mixture of a prepolymer composition and a polyfunctional compound is applied, and then postpolymerization is performed on a substrate, productivity of the pressure sensitive adhesive sheet can be improved, and the thickness of the pressure sensitive adhesive sheet can be made uniform.

The prepolymer composition can be prepared by, for example, partially polymerizing (prepolymerization) a composition obtained by mixing a monomer component for forming the acryl-based segment and a polymerization initiator (so called "prepolymer forming composition"). The prepolymer forming composition may contain a polyfunctional compound (polyfunctional monomer or polyfunctional oligomer). For example, a part of the polyfunctional compound as a raw material for the polymer is included in the prepolymer forming composition, and after polymerization of the prepolymer, the remainder of the polyfunctional compound is added, and subjected to postpolymerization.

The prepolymer forming composition may contain a chain-transfer agent etc. as necessary in addition to the monomer and the polymerization initiator. Although the method for polymerizing a prepolymer is not particularly limited, photopolymerization is preferable because the molecular weight (polymerization ratio) of the prepolymer is easily adjusted. The polymerization initiator and the chain-transfer agent which are used in prepolymerization are not particularly limited, and the above-mentioned photopolymerization initiators and chain-transfer agents can be used.

Although the polymerization ratio of the prepolymer is not particularly limited, the polymerization ratio is preferably 3 to 50% by weight, more preferably 5 to 40% by weight from the viewpoint of obtaining a viscosity suitable for application of the prepolymer onto a substrate. The polymerization ratio of the prepolymer can be adjusted to fall within a desired range by adjusting the type and amount of the photopolymerization initiator, the irradiation intensity and irradiation time of an active ray such as UV light, and so on. The polymerization ratio of the prepolymer is calculated in accordance with the following expression from weights before and after the prepolymer composition is heated at 130° C. for 3 hours. When prepolymerization is performed by solution polymerization, the polymerization ratio is calculated in accordance with the following expression where the weight before drying is a weight obtained by subtracting the amount of the solvent from the total weight of the prepolymer composition.

polymerization ratio of prepolymer (%)=weight after drying/weight before drying×100

A polyfunctional urethane (meth)acrylate, and the remainder of a monomer component for forming the acryl-based segment, a polymerization initiator, a chain-transfer agent, other additives and so on as necessary are mixed with the prepolymer composition to prepare a curable pressure sensitive adhesive composition, and postpolymerization is then performed to obtain a base polymer in which a crosslinked structure is introduced into an acryl-based segment by a urethane-based segment.

The polymerization initiator and the chain-transfer agent to be used for postpolymerization are not particularly limited, and for example, the above-mentioned photopolymerization initiators and chain-transfer agents may be used. When the polymerization initiator in prepolymerization is not deactivated and remains in the prepolymer composition, addition of the polymerization initiator for postpolymerization may be omitted.

The polymerization method for postpolymerization is not particularly limited, and may be identical to or different from the method for polymerizing the prepolymer. When polymerization of the prepolymer is performed by photopolymerization, it is preferable that postpolymerization is also performed by photopolymerization. In particular, for preparing a solvent-free pressure sensitive adhesive composition which does not substantially contain a solvent, photopolymerization is suitable. The polymerization ratio of the reaction product after postpolymerization is preferably 95% or more, more preferably 97% or more, further preferably 99% or more.

The base polymer after postpolymerization has a large molecular weight and a high viscosity, and therefore may be difficult to apply on a substrate. Thus, in formation of the pressure sensitive adhesive sheet, it is preferable that a curable pressure sensitive adhesive composition containing a prepolymer composition and a urethane (meth)acrylate is prepared, and the pressure sensitive adhesive composition is applied in a layer form onto a substrate, followed by performing postpolymerization.

As described above, the curable pressure sensitive adhesive composition may contain the remainder of a monomer component for forming the acryl-based segment, a polymerization initiator, a chain-transfer agent, and so on in addition to the prepolymer composition and the urethane (meth)acrylate. The curable pressure sensitive adhesive composition may contain polymer other than the base polymer, oligomer, various additives and so on.

(Oligomer)

The curable pressure sensitive adhesive composition and the cured pressure sensitive adhesive may contain oligomers for the purpose of, for example, adjusting the adhesive strength and the viscosity. As the oligomer, one having a weight average molecular weight of, for example, about 1000 to 30000 is used. The oligomer is preferably an acryl-based oligomer because it is excellent in compatibility with the acryl-based base polymer.

The acryl-based oligomer contains a (meth)acrylic acid alkyl ester as a main constituent monomer component. In particular, the acryl-based oligomer is preferably one containing as a constituent monomer component a (meth)acrylic acid alkyl ester having a linear or branched alkyl group (linear or branched alkyl (meth)acrylate) and a (meth)acrylic acid alkyl ester having a cycloaliphatic alkyl group (cycloaliphatic alkyl (meth)acrylate). Specific examples of the linear or branched alkyl (meth)acrylate and the cycloaliphatic alkyl (meth)acrylate are as shown above as constituent monomers of the acryl-based segment.

The glass transition temperature of the acryl-based oligomer is preferably 20° C. or higher, more preferably 30° C. or higher, further preferably 40° C. or higher. When a base polymer which has a low glass transition temperature (Tg) and in which a crosslinked structure is introduced by a urethane-based segment, and an acryl-based oligomer having a high glass transition temperature (Tg) are used in combination, the high-temperature retaining force of the pressure sensitive adhesive tends to be improved. The upper limit of the glass transition temperature of the acryl-based oligomer is not particularly limited, but is generally 200° C. or lower, preferably 180° C. or lower, more preferably 160° C. or lower. The glass transition temperature of the acryl-based oligomer is calculated in accordance with the Fox equation.

Among the shown (meth)acrylic acid alkyl esters, the linear or branched alkyl (meth)acrylate is preferably methyl methacrylate because it has a high glass transition temperature, and is excellent in compatibility with the base polymer. As the cycloaliphatic alkyl (meth)acrylate, dicyclopentanyl acrylate, dicyclopentanyl methacrylate, cyclohexyl acrylate and cyclohexyl methacrylate are preferable. That is, the acryl-based oligomer is preferably one containing as constituent monomer components at least one selected from the group consisting of dicyclopentanyl acrylate, dicyclopentanyl methacrylate, cyclohexyl acrylate and cyclohexyl methacrylate, and methyl methacrylate.

The amount of the cycloaliphatic alkyl (meth)acrylate based on the total amount of monomer components for forming the acryl-based oligomer is preferably 10 to 90% by weight, more preferably 20 to 80% by weight, further preferably 30 to 70% by weight. The amount of the linear or branched alkyl (meth)acrylate based on the total amount of monomer components for forming the acryl-based oligomer is preferably 10 to 90% by weight, more preferably 20 to 80% by weight, further preferably 30 to 70% by weight.

The weight average molecular weight of the acryl-based oligomer is preferably 1000 to 30000, more preferably 1500 to 10000, further preferably 2000 to 8000. When an acryl-based oligomer having a molecular weight falling within the above-mentioned range is used, the adhesive strength and the high-temperature retaining force of the pressure sensitive adhesive tend to be improved.

The acryl-based oligomer is obtained by polymerizing the above-mentioned monomer components by various polymerization methods. In polymerization of the acryl-based oligomer, various polymerization initiators may be used. In addition, a chain-transfer agent may be used for the purpose of adjusting the molecular weight.

When the pressure sensitive adhesive composition contains an oligomer component such as an acryl-based oligomer, the content of the oligomer component is preferably 0.5 to 20 parts by weight, more preferably 1 to 15 parts by weight, further preferably 2 to 10 parts by weight based on 100 parts by weight of the base polymer. When the content of the oligomer in the pressure sensitive adhesive composition is within the above-mentioned range, adhesiveness at a high temperature and the retaining force at a high temperature tend to be improved.

(Silane Coupling Agent)

A silane coupling agent can also be added in the pressure sensitive adhesive composition for the purpose of adjusting the adhesive strength. When the pressure sensitive adhesive composition includes a silane coupling agent, the content thereof is normally about 0.01 to 5.0 parts by weight, preferably 0.03 to 2.0 parts by weight based on 100 parts by weight of the base polymer.

(Crosslinker)

The base polymer may have a crosslinked structure formed by other than that of the above-mentioned polyfunctional compound as necessary. The crosslinked structure can be introduced in the base polymer by adding a crosslinker into the pressure sensitive adhesive composition. The crosslinker can form a crosslinked structure by reacting with a functional group, such as a hydroxyl group and a carboxy group introduced into the base polymer. Specific examples of the crosslinker include isocyanate-based crosslinkers, epoxy-based crosslinkers, oxazoline-based crosslinkers, aziridine-based crosslinkers, carbodiimide-based crosslinkers and metal chelate-based crosslinkers.

As described above, the low-temperature adhesive strength of the pressure sensitive adhesive may decrease when the amount of the crosslinked structure introduced by components other than the urethane-based segment is increased. Thus, the amount of the crosslinker is preferably 3 parts by weight or less, more preferably 2 parts by weight or less, further preferably 1 part by weight or less based on 100 parts by weight of the base polymer.

(Other Additives)

In addition to the components exemplified above, additives such as a tackifier, a plasticizer, a softener, a degradation inhibitor, a filler, a colorant, an ultraviolet ray absorber, an antioxidant, a surfactant and an antistatic agent may be contained in the pressure sensitive adhesive composition.

<Preparation of Pressure Sensitive Adhesive Composition>

A pressure sensitive adhesive composition can be prepared by mixing the above-described components, and a solvent as necessary. When the pressure sensitive adhesive sheet is formed, it is preferable that the pressure sensitive adhesive composition has a viscosity (e.g., about 0.5 to 20 Pa·s) suitable for application of the composition onto a substrate. When the pressure sensitive adhesive composition is a solution, the viscosity of the composition can be adjusted to fall within an appropriate range by adjusting the molecular weight of the polymer, the solid content of the solution, and so on.

As described above, in formation of the pressure sensitive adhesive sheet, it is preferable that a curable pressure sensitive adhesive composition containing a prepolymer composition and a urethane (meth)acrylate is prepared, and the pressure sensitive adhesive composition is applied in a layer form onto a substrate, followed by performing post-polymerization. The viscosity of the pressure sensitive adhesive composition can be adjusted to fall within an appropriate range by adjusting the polymerization ratio of the prepolymer, the added amount of the urethane (meth)acrylate, the added amount of the oligomer and so on. In the pressure sensitive adhesive composition, additives such as thickener may be used for the purpose of, for example, adjusting the viscosity.

[Pressure Sensitive Adhesive Sheet]

A pressure sensitive adhesive sheet is obtained by forming the pressure sensitive adhesive composition into a sheet. When the pressure sensitive adhesive composition is curable, the composition is applied onto a substrate, and then subjected to postpolymerization on the substrate by heating, active ray irradiation etc. to obtain a pressure sensitive adhesive sheet composed of a pressure sensitive adhesive in which a crosslinked structure is introduced into an acryl-based segment by a urethane-based segment.

The thickness of the pressure sensitive adhesive sheet is not particularly limited, and may be appropriately set according to, for example, the type of an adherend. The thickness of the pressure sensitive adhesive sheet is, for example, about 5 to 500 µm. From the viewpoint of securing both adhesiveness to an adherend and uniformity of the thickness, the thickness of the pressure sensitive adhesive sheet is preferably 10 to 400 µm, more preferably 15 to 350 µm.

For applying the pressure sensitive adhesive composition on the substrate, various kinds of coating methods such as roll coating, kiss roll coating, gravure coating, reverse coating, roll brushing, spray coating, dip roll coating, bar coating, knife coating, air knife coating, curtain coating, lip coating, and extrusion coating may be employed.

When the pressure sensitive adhesive composition is a solution, it is preferable to dry the solution after application of the pressure sensitive adhesive composition. As a drying method, drying by heating is preferable. The temperature of drying by heating is preferably 40° C. to 200° C., more preferably 50° C. to 180° C., especially preferably 70° C. to 170° C. As a drying time, a suitable time can be appropriately employed. The drying time is preferably 5 seconds to 20 minutes, more preferably 5 seconds to 15 minutes, especially preferably 10 seconds to 10 minutes.

When the pressure sensitive adhesive composition is photocurable, the pressure sensitive adhesive composition applied onto a substrate is irradiated with an active ray to be photocured. At the time of performing photocuring, it is preferable that a cover sheet is disposed over the surface of the coating layer, and the pressure sensitive adhesive composition is irradiated with an active ray while being held between two sheets, so that hindrance of polymerization by oxygen is prevented.

The active ray may be selected according to the type of a polymerizable component such as a monomer or urethane (meth)acrylate, the type of a photopolymerization initiator or the like, and in general, an ultraviolet ray and/or visible light having a short wavelength are used. The accumulated amount of irradiation light is preferably about 100 to 5000 mJ/cm². The light source for photoirradiation is not particularly limited as long as it can emit light in a wavelength range over which the photopolymerization initiator contained in the pressure sensitive adhesive composition is sensitive to light, and a LED light source, a high-pressure mercury lamp, an ultra-high mercury lamp, a metal halide lamp, a xenon lamp or the like is preferably used.

For each of the substrate and cover sheet to be used for formation of the pressure sensitive adhesive sheet, any suitable material is used. Each of the substrate and the cover sheet may be a release film having a release layer on a contact surface with the pressure sensitive adhesive sheet.

Figure 1:
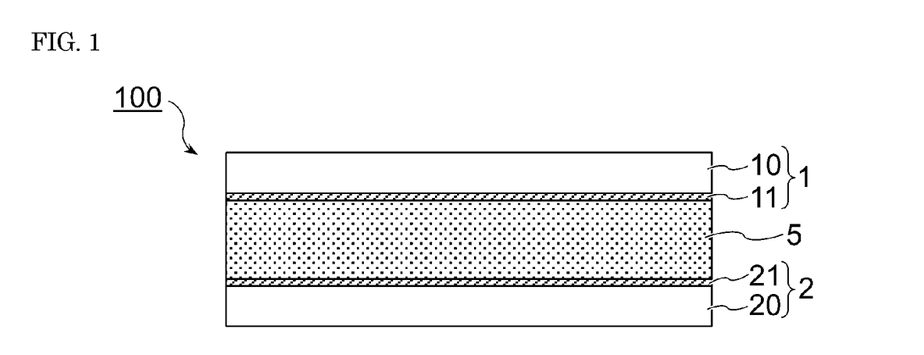
FIG. 1 is a sectional view showing an example of a configuration of a release film-equipped pressure sensitive adhesive sheet.

FIG. 1 is a sectional view showing an example of a configuration of a release film-equipped pressure sensitive adhesive sheet in which release films 1 and 2 are temporarily attached, respectively, to both surfaces of a pressure sensitive adhesive sheet 5. The release films 1 and 2 are used for the purpose of protecting the surfaces of the pressure sensitive adhesive sheet until the pressure sensitive adhesive sheet 5 is used for bonding to an adherend. Preferably, release films 1 and 2 have release layers 11 and 21 on surfaces of base films 10 and 20 (surface to be contact to the pressure sensitive adhesive sheet 5), respectively.

As the base film of the release film, films composed of various resin materials are used. Examples of the resin material include polyester-based resins such as polyethylene terephthalate and polyethylene naphthalate, acetate-based resins, polyether sulfone-based resins, polycarbonate-based resins, polyamide-based resins, polyimide-based resins, polyolefin-based resins, (meth)acryl-based resins, polyvinyl chloride-based resins, polyvinylidene chloride-based resins, polystyrene-based resins, polyvinyl alcohol-based resins, polyacrylate-based resins and polyphenylene sulfide-based resins. Among them, polyester-based resins such as polyethylene terephthalate are especially preferable.

The thickness of the base film is preferably 10 to 200 µm, more preferably 25 to 150 µm. When release films 1 and 2 are disposed on both surfaces of the pressure sensitive adhesive sheet 5, the thickness of one release film 1 and the thickness of the other release film 2 may be the same, or different. When the pressure sensitive adhesive composition is applied to the release film as a substrate, and then photocured by irradiating the pressure sensitive adhesive composition with an active ray through the release film, the release film provided on the photoirradiation surface is preferably transparent.

Examples of the material of the release layer include silicone-based release agents, fluorine-based release agents, long-chain alkyl-based release agents and aliphatic amide-based release agents. The thickness of the release layer is generally about 10 to 2000 nm. The peeling strength of the release films 1 and 2 from the pressure sensitive adhesive layer 5 can be adjusted by changing the type of release agent and the thickness of the release layer.

The peeling strength in peeling of the first release film 1 from the pressure sensitive adhesive sheet 5 and the peeling strength in peeling of the second release film 2 from the pressure sensitive adhesive sheet 5 may be the same or different. When the peeling strength of the release film on one surface is different from the peeling strength of the release film on the other surface, excellent workability can be attained by performing the bonding of adherends in the following procedure: the release film 2 with relatively small peeling strength is first peeled from the pressure sensitive adhesive sheet 5, and bonded to a first adherend, and the release film 1 with relatively large peeling strength is peeled, and bonded to a second adherend.

As the release films 1 and 2, the substrate or cover sheet used during formation of the pressure sensitive adhesive sheet (application of the pressure sensitive adhesive composition) may be used as such, or replaced by other release film.

<Physical Properties of Pressure Sensitive Adhesive Sheet>

The pressure sensitive adhesive sheet may have both adhesiveness at a low temperature and an adhesion retaining force at a high temperature, because the base polymer of the pressure sensitive adhesive includes an acryl-based segment and a urethane-based segment. By adjusting the type and content of the urethane-based segment, cloudiness of the pressure sensitive adhesive sheet with deformation by tension etc. is suppressed.

From the viewpoint of increasing the retaining force at a high temperature, the shear storage elastic modulus of the pressure sensitive adhesive sheet at a temperature of 25° C. ($G'_{25° C.}$) is preferably 0.05 MPa or more, more preferably 0.10 MPa or more, further preferably 0.13 MPa or more, especially preferably 0.15 MPa. In addition, the shear storage elastic modulus of the pressure sensitive adhesive sheet at a temperature of 80° C. ($G'_{80° C.}$) is preferably 0.01 MPa or more, more preferably 0.03 MPa or more, further preferably 0.05 MPa or more.

The upper limit of each of the shear storage elastic moduli $G'_{25° C.}$ and $G'_{80° C.}$ is not particularly limited from the viewpoint of the adhesion retaining force. For imparting moderate viscidity and wettability to the pressure sensitive adhesive sheet, the shear storage elastic modulus $G'_{25° C.}$ is preferably 3 MPa or less, more preferably 1 MPa or less, further preferably 0.5 MPa or less. From the same viewpoint as described above, the shear storage elastic modulus $G'_{80° C.}$ is preferably 0.3 MPa or less, more preferably 0.25 MPa or less.

From the viewpoint of securing both the retaining force at a high temperature and adhesiveness at a low temperature, the product of the glass transition temperature Tg (° C.) of the pressure sensitive adhesive sheet and the shear storage elastic modulus $G'_{25° C.}$ (MPa) of the pressure sensitive adhesive sheet at a temperature of 25° C. is preferably −1 or less, more preferably −3 or less, further preferably −4 or less.

<Use of Pressure Sensitive Adhesive Sheet>

The pressure sensitive adhesive sheet can be used for bonding various transparent members and opaque members. The type of the adherend is not particularly limited, and examples thereof include various resin materials, glass and metals. In particular, the pressure sensitive adhesive sheet is suitable for applications requiring transparency because tensile cloudiness is suppressed. In other words, the pressure sensitive adhesive sheet can be suitably used for bonding transparent members or bonding a transparent member to an opaque member.

Figure 2:
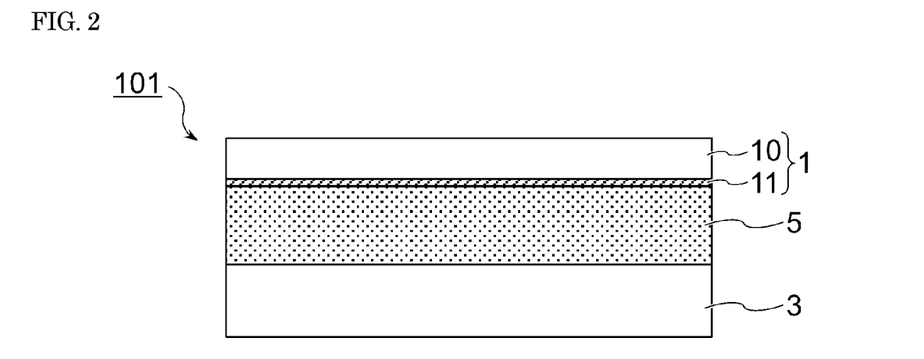
FIG. 2 is a sectional view showing a usage example of a pressure sensitive adhesive sheet.

FIG. 2 is a sectional view of a pressure sensitive adhesive film in which a transparent film 3 is fixed onto one surface of the pressure sensitive adhesive sheet 5. In the pressure sensitive adhesive film 101 shown in FIG. 2, the release film 1 is temporarily attached to the other surface of the pressure sensitive adhesive sheet 5.

The visible light transmittance of the transparent film 3 is preferably 80% or more, more preferably 90% or more. Although the thickness of the transparent film 3 is not particularly limited, the thickness is preferably about 5 to 300 μm, more preferably 10 to 250 μm, further preferably 20 to 200 μm from the viewpoint of operability such as strength and handling characteristics, thinning and the like.

Examples of the resin material for forming the transparent film 3 include thermoplastic resins excellent in transparency, mechanical strength and heat stability. Specific examples of the thermoplastic resin include cellulose-based resins such as triacetyl cellulose, polyester-based resins, polyethersulfone-based resins, polysulfone-based resins, polycarbonate-based resins, polyamide-based resins, polyimide-based resins, polyolefin-based resins, (meth)acryl-based resins, cyclic polyolefin-based resins (norbornene-based resins), polyarylate-based resins, polystyrene-based resins, polyvinyl alcohol-based resins, and mixtures thereof.

In formation of the transparent film-equipped pressure sensitive adhesive sheet as shown in FIG. 2, for example, one release film 2 may be peeled from the release film-equipped pressure sensitive adhesive sheet as shown in FIG. 1, followed by bonding the exposed surface of the pressure sensitive adhesive sheet 5 to the transparent film 3. One of the substrate and the cover sheet which are used during formation (application) of the pressure sensitive adhesive sheet may be remain attached to the pressure sensitive adhesive to be used as the transparent film 3.

By peeling the release film 1 temporarily attached on a surface of the pressure sensitive adhesive sheet 5, and then bonding the exposed surface of the pressure sensitive adhesive sheet 5 to an adherend, the pressure sensitive adhesive film can be bonded to a surface of the adherend.

The pressure sensitive adhesive film is used for protection of a surface of a member which is deformed in use, etc. For example, the pressure sensitive adhesive film can be used for protection of a surface of a membrane switch. In the membrane switch, characters symbols, graphics and so on are printed on a surface sheet for the purpose of, for example, identification of the switch. When the printed surface of the surface sheet is exposed, prints may be thinned with use, thus making it difficult to identify characters etc., and therefore a protective sheet is provided on the printed surface.

When the switch is depressed from above the pressure sensitive adhesive film provided as a protective sheet, the pressure sensitive adhesive sheet is deformed. The pressure sensitive adhesive sheet is hardly clouded with deformation, and therefore even when the switch is repeatedly depressed, transparency is retained, so that the visibility of characters etc. printed on the surface sheet can be maintained.

The pressure sensitive adhesive sheet is excellent in transparency, and has high adhesiveness at a low temperature and a high retaining force at a high temperature. Therefore, the pressure sensitive adhesive sheet is applicable not only to membrane switches, but also to bonding of various kinds of materials.

EXAMPLES

Examples and comparative examples are shown below, but the present invention is not limited to these examples.

[Preparation of Acrylic Oligomer]

60 parts by weight of dicyclopentanyl methacrylate (DCPMA), 40 parts by weight of methyl methacrylate (MMA), 3.5 parts by weight of α-thioglycerol as a chain-transfer agent, and 100 parts by weight of toluene as a polymerization solvent were mixed, and stirred in a nitrogen atmosphere at 70° C. for 1 hour. 0.2 parts by weight of 2,2'-azobisisobutyronitrile (AIBN) is added as a thermopolymerization initiator, and the mixture was reacted at 70° C. for 2 hours, then heated to 80° C., and reacted for 2 hours. Thereafter, the reaction liquid was heated to 130° C., and toluene, the chain-transfer agent and unreacted monomers were removed by drying to obtain a solid acrylic oligomer. The weight average molecular weight of the acrylic oligomer was 5100.

Example 1

(Polymerization of Prepolymer)

52.8 parts by weight of butyl acrylate (BA), 10.9 parts by weight of cyclohexyl acrylate (CHA), 9.7 parts by weight of N-vinyl-2-pyrrolidone (NVP), 14.8 parts by weight of 4-hydroxybutyl acrylate (4HBA) and 11.8 parts by weight of isostearyl acrylate (ISTA) as prepolymer forming monomer components, and photopolymerization initiators (0.035 parts by weight of "IRGACURE 184" manufactured by BASF SE and 0.035 parts by weight of "IRGACURE 651" manufactured by BASF SE) were blended, and the mixture was irradiated with an ultraviolet ray to a viscosity of about 20 Pa·s (BH viscometer No. 5 Rotor, 10 rpm, measurement temperature: 30° C.), so that the mixture was polymerized to obtain a prepolymer composition (polymerization ratio: about 9%).

(Preparation of Photocurable Pressure Sensitive Adhesive Composition)

The following materials are added to the prepolymer composition: 7 parts by weight of a terminally acrylic-modified polyether urethane ("UV-3300B" manufactured by The Nippon Synthetic Chemical Industry Co., Ltd.) and 3 parts by weight of a terminally acrylic-modified polyether urethane ("UV-3010B" manufactured by The Nippon Synthetic Chemical Industry Co., Ltd.) as urethane (meth)acrylates; 5 parts by weight of the acrylic oligomer; 0.05 parts by weight of IRGACURE 184 and 0.57 parts by weight of IRGACURE 651 as photopolymerization initiators; 0.2 parts by weight of an α-methylstyrene dimer ("NOFMER MSD" manufactured by NOF CORPORATION) as a chain-transfer agent; and 0.3 parts by weight of "KBM 403" manufactured by Shin-Etsu Chemical Co., Ltd. as a silane coupling agent. The mixture was then heterogeneously mixed to prepare a pressure sensitive adhesive composition.

(Preparation of Pressure Sensitive Adhesive Sheet)

On a 50 μm-thick polyethylene terephthalate (PET) film having a silicone-based release layer on a surface thereof ("DIAFOIL MRF50" manufactured by Mitsubishi Chemical Corporation), the photocurable pressure sensitive adhesive composition was applied in a thickness of 150 μm to form a coating layer. A 38 μm-thick PET film with one surface subjected to silicone release treatment ("DIAFOIL MRF38" manufactured by Mitsubishi Chemical Corporation) was bonded onto a surface of the coating layer. By a black light, which was position-adjusted so that the irradiation intensity at an irradiation surface just below the lamp was 5 mW/cm$^2$, the laminate was irradiated with an ultraviolet ray from the 38 μm-thick PET film-side for 300 seconds to photocure the pressure sensitive adhesive composition. Thereafter, drying treatment was performed in a dryer at 90° C. for 2 minutes to volatilize remaining monomers, thereby obtaining a pressure sensitive adhesive sheet having a thickness of 150 μm.

Examples 2 to 6 and Comparative Examples 1 to 5

The compositions of charged monomers in polymerization of the prepolymer, and the types and added amounts of the polyfunctional compound (urethane acrylate and/or polyfunctional acrylate), acrylic oligomer, photopolymerization initiator and chain-transfer agent added to the pressure sensitive adhesive composition were changed as shown in Table 1. In the same manner as in Example 1 except for the above, the photocurable pressure sensitive adhesive composition was prepared. Thus obtained photocurable pressure sensitive adhesive composition was applied onto the substrate and photocured, and then volatilization of remaining monomers by drying was performed as in Example 1 to obtain a pressure sensitive adhesive sheet.

In Table 1, the components are represented by the following abbreviations.

<Acryl-Based Monomer>
BA: butyl acrylate
2HEA: 2-ethylhexyl acrylate
CHA: cyclohexyl acrylate
NVP N-vinyl-2-pyrrolidone
4HBA: 4-hydroxybutyl acrylate
2HEA: 2-hydroxyethyl acrylate
ISTA: isostearyl acrylate
2MEA: 2-methoxyethyl acrylate <Urethane Acrylate>
UN-350: "ART RESIN UN-350" manufactured by Negami Chemical Industrial Co., Ltd. (polyester urethane diacrylate having a weight average molecular weight of about 12500 and a glass transition temperature of −57° C.)
UV-3300B: "UV-3300B" manufactured by The Nippon Synthetic Chemical Industry Co., Ltd. (polyether urethane diacrylate having a weight average molecular weight of about 12000 and a glass transition temperature of −30° C.)
UV-3010B: "UV-3010B" manufactured by The Nippon Synthetic Chemical Industry Co., Ltd. (polyester urethane diacrylate having a weight average molecular weight of about 11000)
UV-3000B: "UV-3000B" manufactured by The Nippon Synthetic Chemical Industry Co., Ltd. (polyester urethane diacrylate having a weight average molecular weight of about 18000 and a glass transition temperature of −39° C.)

<Polyfunctional Acrylate>
HDDA: hexanediol diacrylate

<Photopolymerization Initiator>
Irg651: IRGACURE 651 (2,2-dimethoxy-1,2-diphenylethane-1-one)
Irg184: IRGACURE 184 (1-hydroxy-cyclohexyl-phenyl-ketone)

[Evaluation]

<Weight Average Molecular Weight>

The weight average molecular weights (Mw) of the acrylic oligomer and urethane (meth)acrylate were measured by a GPC (gel permeation chromatography) apparatus (product name "HLC-8120GPC") manufactured by TOSOH CORPORATION. The base polymer was dissolved in tetrahydrofuran to prepare a 0.1 wt % solution, this solution was filtered with a 0.45 μm membrane filter, and the resulting filtrate was used as a measurement sample. GPC measurement conditions are as follows.

(Measurement Conditions)
Column: G7000HXL+GMHXL+GMHXL manufactured by TOSOH CORPORATION
Column size: each 7.8 mmφ×30 cm (total column length: 90 cm)
Column temperature: 40° C., Flow rate: 0.8 mL/min
Injection amount: 100 μL
Eluent: tetrahydrofuran
Detector: differential refractometer (RI)
Standard sample: polystyrene <Storage Elastic Modulus and Glass Transition Temperature of Pressure Sensitive Adhesive Sheet>

Ten pressure sensitive adhesive sheets were laminated to a thickness of about 1.5 mm, and the laminate thus obtained was used as a sample for measurement. The dynamic viscoelasticity was measured under the following conditions using "Advanced Rheometric Expansion System (ARES)" manufactured by Rheometric Scientific, Inc.

(Measurement Conditions)
Deformation mode: torsion
Measurement Frequency: 1 Hz
Temperature elevation rate: 5° C./minute
Shape: parallel plate (7.9 mmφ)

The shear storage elastic modulus was determined by reading a storage elastic modulus G' at each temperature from the measurement result. The temperature at which the loss tangent (tan δ) was maximum (peak-top temperature) was defined as a glass transition temperature of the pressure sensitive adhesive sheet.

<Tensile Cloudiness>

The pressure sensitive adhesive sheet was cut to a width of 20 mm and a length of 50 mm, one release film was peeled off, and a PET film having a thickness of 75 μm was bonded to each of both ends of the pressure sensitive adhesive sheet in the length direction with a contact area of 20 mm (width)×15 mm (length). The other release film of the pressure sensitive adhesive sheet was peeled off, and the PET films bonded to both ends were then pulled to stretch the pressure sensitive adhesive sheet by a factor of 2 in the length direction (the distance between the PET films at both ends was 60 mm). The stretched pressure sensitive adhesive sheet was visually examined. The pressure sensitive adhesive sheet was rated "OK" when it was transparent, and the pressure sensitive adhesive sheet was rated "NG" when it was clouded.

[Evaluation Results]

Compositions and evaluation results for the pressure sensitive adhesive sheets are shown in Table 1.

TABLE 1

| | | Example 1 | Example 2 | Example 3 | Example 4 | Example 5 | Example 6 |
|---|---|---|---|---|---|---|---|
| prepolymer composition | BA | 52.8 | 53.2 | 51.6 | 52.8 | — | — |
| | 2EHA | — | — | — | — | 40.0 | 45.0 |
| | CHA | 10.9 | 10.9 | 10.6 | 10.9 | — | — |
| | NVP | 9.7 | 9.0 | 11.7 | 9.7 | 30.0 | 25.0 |
| | 4HBA | 14.8 | 14.9 | 14.5 | 14.8 | 10.0 | 10.0 |
| | 2HEA | — | — | — | — | — | — |
| | ISTA | 11.8 | 11.9 | 11.6 | 11.8 | — | — |
| | 2MEA | — | — | — | — | 20.0 | 20.0 |
| urethane diacrylate | UN-350 | — | 5 | — | — | — | — |
| | UV-3300B | 7 | 5 | 10 | 7 | 10 | 10 |
| | UV-3010B | 3 | — | 10 | 3 | — | — |
| | UV-3000B | — | — | — | — | — | — |
| polyfunctional acrylate | HDDA | — | — | 0.2 | — | 0.2 | 0.2 |
| acrylic oligomer | | 5 | 5 | 5 | 5 | 5 | 5 |
| photo-polymerization initiator | Irg651 | 0.57 | 0.57 | 0.57 | 0.57 | 0.55 | 0.55 |
| | Irg184 | 0.05 | 0.05 | 0.07 | 0.07 | 0.05 | 0.05 |
| chain-transfer agent | NOFMER MSD | 0.2 | 0.2 | 0.2 | 0.2 | 0.2 | 0.2 |
| silane coupling agent | KBM-403 | 0.3 | 0.3 | 0.3 | 0.3 | 0.3 | 0.3 |
| Tg (° C.) | | −5.0 | −5.0 | −5.8 | −5.3 | N.D. | −2.3 |
| $G'_{25°C.}$ (MPa) | | 0.21 | 0.20 | 0.22 | 0.23 | N.D. | 0.24 |
| $G'_{80°C.}$ (MPa) | | 0.14 | 0.11 | 0.15 | 0.18 | N.D. | 0.19 |
| tensile cloudiness | | OK | OK | OK | OK | OK | OK |

| | | Comparative Example 1 | Comparative Example 2 | Comparative Example 3 | Comparative Example 5 | Comparative Example 5 |
|---|---|---|---|---|---|---|
| prepolymer composition | BA | — | — | — | — | 52.8 |
| | 2EHA | 71.8 | 71.8 | 66.2 | 81.3 | — |
| | CHA | — | — | — | — | 10.9 |
| | NVP | 17.1 | 17.1 | 23.6 | 18.8 | 9.7 |
| | 4HBA | 11.1 | 11.1 | 10.2 | — | 14.8 |
| | 2HEA | 14.8 | 14.8 | 13.7 | 4.2 | — |
| | ISTA | — | — | — | — | 11.8 |
| | 2MEA | — | — | — | — | — |
| urethane diacrylate | UN-350 | — | — | — | — | — |
| | UV-3300B | — | — | — | — | 40 |
| | UV-3010B | — | — | — | — | — |
| | UV-3000B | 10 | 20 | 20 | 20 | — |
| polyfunctional acrylate | HDDA | 0.2 | 0.2 | 0.2 | 0.2 | — |
| acrylic oligomer | | 5 | 5 | 0 | 5 | 5 |
| photo-polymerization initiator | Irg651 | 0.85 | 0.85 | 0.55 | 0.55 | 0.55 |
| | Irg184 | 0.05 | 0.05 | 0.05 | 0.05 | 0.05 |
| chain-transfer agent | NOFMER MSD | 0.25 | 0.25 | 0.25 | 0.2 | 0.2 |
| silane coupling agent | KBM-403 | 0.3 | 0.3 | 0.3 | 0.3 | 0.3 |
| Tg (° C.) | | −10.3 | −12.4 | −5.6 | −18.9 | N.D. |
| $G'_{25°C.}$ (MPa) | | 0.14 | 0.17 | 0.22 | 0.12 | N.D. |
| $G'_{80°C.}$ (MPa) | | N.D. | N.D. | N.D. | N.D. | N.D. |
| tensile cloudiness | | NG | NG | NG | NG | NG |

The pressure sensitive adhesive sheet of each of Examples 1 to 6 was not clouded after the tension test. The pressure sensitive adhesive sheets of Comparative Examples 1 to 4, which included only a polyester urethane chain as a urethane-based segment, were clouded. The pressure sensitive adhesive sheet of Comparative Example 5, which included 40 parts by weight of a urethane-based segment based on 100 parts by weight of the acryl-based segment, was clouded.

The pressure sensitive adhesive sheets of Comparative Examples 2 to 4, which included 20 parts by weight of a urethane-based segment based on 100 parts by weight of the acryl-based segment, were clouded, whereas the pressure sensitive adhesive sheet of Example 3 was not clouded. Comparison between Example 3 and Comparative Example 1 shows that cloudiness did not occur in Example 3, and cloudiness occurred in Comparative Example 1, even though the content of a urethane-based segment (polyester urethane segment) other than a polyether urethane-based segment was 10 parts by weight in both Example 3 and Comparative Example 1, and the content of the urethane-based segment was higher in Example 3. This may be because in Example 3 where the main monomer is butyl acrylate, the acryl-based segment is excellent in compatibility with the urethane-based segment.

The above results show that by adjusting the configuration of the acryl-based segment, and the type and amount of the urethane-based segment bonded to the acryl-based segment, a pressure sensitive adhesive sheet is obtained in which tensile cloudiness is suppressed.

What is claimed is:

1. A pressure sensitive adhesive sheet in which a pressure sensitive adhesive comprising an acryl-based base polymer is formed in a layer shape,
    the acryl-based base polymer contains an acryl-based segment and a urethane-based segment, and a content of the urethane-based segment is 3 to 30 parts by weight based on 100 parts by weight of the acryl-based segment,
    the urethane-based segment includes at least one urethane chain selected from the group consisting of a polyether urethane and a polyester urethane, a content of a polyether urethane-based segment is 0 to 30 parts by weight based on 100 parts by weight of the acryl-based segment, and a content of the urethane-based segment other than the polyether urethane-based segment is 15 parts by weight or less based on 100 parts by weight of the acryl-based segment.

2. The pressure sensitive adhesive sheet according to claim 1, wherein a weight average molecular weight of the urethane-based segment is 3000 to 50000.

3. The pressure sensitive adhesive sheet according to claim 1, wherein an amount of a (meth)acrylic acid alkyl ester having a linear or branched alkyl group having 6 or less carbon atoms is 30 to 80% by weight based on a total amount of constituent monomer components of the acryl-based segment.

4. The pressure sensitive adhesive sheet according to claim 1, wherein a content of a polyether urethane-based segment is 3 parts by weight or more based on 100 parts by weight of the acryl-based segment.

5. The pressure sensitive adhesive sheet according to claim 1, wherein in the acryl-based base polymer, the acryl-based segment is crosslinked with the urethane-based segment.

6. The pressure sensitive adhesive sheet according to claim 1, wherein a content of the acryl-based base polymer in the pressure sensitive adhesive is 50% by weight or more.

7. The pressure sensitive adhesive sheet according to claim 1, further comprising an acryl-based oligomer having a weight average molecular weight of 1000 to 30000.

8. A pressure sensitive adhesive film, comprising:
    the pressure sensitive adhesive sheet according to claim 1; and
    a transparent film fixed onto one surface of the pressure sensitive adhesive sheet.

* * * * *